United States Patent
Aguilar et al.

(10) Patent No.: US 6,779,110 B1
(45) Date of Patent: Aug. 17, 2004

(54) NETWORK STATION SUITABLE FOR IDENTIFYING AND PRIORITIZING BOOT INFORMATION FOR LOCATING AN OPERATING SYSTEM KERNEL ON A REMOTE SERVER

(75) Inventors: Maximino Aguilar, Austin, TX (US); Sanjay Gupta, Austin, TX (US); Roy Moonseuk Kim, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 09/710,923

(22) Filed: Nov. 9, 2000

(51) Int. Cl.[7] ........................ G06F 9/24; G06F 15/177
(52) U.S. Cl. ............................ 713/2; 709/222
(58) Field of Search ................. 713/2, 1; 709/220, 709/222

(56) References Cited

U.S. PATENT DOCUMENTS

| | | | | |
|---|---|---|---|---|
| 5,974,546 A | * | 10/1999 | Anderson | ............ 713/2 |
| 6,292,890 B1 | * | 9/2001 | Crisan | ............ 713/2 |
| 6,356,965 B1 | * | 3/2002 | Broyles et al. | ............ 710/104 |

* cited by examiner

Primary Examiner—Thomas Lee
Assistant Examiner—Eric Chang
(74) Attorney, Agent, or Firm—Lally & Lally, LLP (57) ABSTRACT

A method and system for booting a user station in a computer network in which a first set of operating system information retrieved from the user station is used to attempt to boot the user station from a remote server. If the boot attempt fails, an iterative process is initiated in which a next set of operating system information is retrieved and used to attempt to boot the user station until a boot attempt is successful. Upon successfully booting the user station, the operating system information is modified to prioritize the set of information that resulted in a successful boot such that the successful set of information is selected first during a subsequent boot attempt. The operating system information may include a directory path of the remote server in which the user station attempts to locate an operating system kernel.

16 Claims, 7 Drawing Sheets

| PARAMETER 304 | DEFAULT VALUE 306 | DEFAULT INDICATOR 308 | OVERRIDE INDICATOR 310 | |
|---|---|---|---|---|
| NS IP ADDRESS | | | | ← 302 |
| GATEWAY IP ADDRESS | | | | ← 302 |
| DNS IP ADDRESS | | | | ← 302 |
| BOOT SERVER IP ADDRESS | | | | ← 302 |
| CONFIG FILE PATH | | | | ← 302 |
| | | | | |
| | | | | |

NETWORK STATION SUITABLE FOR IDENTIFYING AND PRIORITIZING BOOT INFORMATION FOR LOCATING AN OPERATING SYSTEM KERNEL ON A REMOTE SERVER

RELATED APPLICATION

The subject matter disclosed herein is related to the subject matter disclosed in the patent application of Aguilar entitled Network Station Suitable for Identifying and Prioritizing Network Adapters, Docket No. AUS000444US1, which shares a common inventor and assignee with the present application.

BACKGROUND

1. Field of the Present Invention

The present invention generally relates to field of network computing and more particularly to improving the performance and flexibility of network stations by incorporating improvements into the boot sequence code.

2. History of Related Art

Data processing networks typically include a variety of data processing devices. Among these, user stations or network stations provide economical devices with which multiple users can access applications from a network server. Typically, the network station does not have a permanent mass storage device such as a hard disk suitable for permanently storing operating system and application programs. Instead, the network station operates by retrieving operating system and application code from one or more network servers. The centralization of application and operating system software on servers simplifies the task of controlling the software that is available to end users of the network. In addition, the overall cost of the network is reduced by reducing the number of hard disk devices that the network includes. Despite these advantages, the lack of local permanent mass storage means that user stations must typically perform a relatively extensive and time consuming boot sequence following a reset or power on to establish a network connection with a server and retrieve the necessary code from the server. It would therefore be desirable to implement improvements to the network station boot code to reduce the boot time. It would be further desirable if the implemented solution gave the user greater control over the boot process without significantly increasing the cost of the network station.

SUMMARY OF THE INVENTION

The problems identified above are in large part addressed by a data processing system and a method in which the user station boot process is made more efficient by storing information about successful boots that may be used in subsequent boot sequences and by enabling the user to specify parameters that may be supplied as default values if a dynamic boot protocol fails to supply a particular parameter. In one embodiment, the invention is suitable for use with a user station that includes more than one network adapter card. In this embodiment, the boot code sequence may include trying to boot using each of the network adapters. If one adapter is connected to a network and enables the user station to reach a boot server, the adapter information is recorded in a non-volatile storage device (NVRAM) of the user station. During subsequent boot sequences, the boot code will retrieve the recorded adapter information before attempting to boot and will use the adapter indicated by the recorded information to boot the user station. In another embodiment, the boot code may cycle through a predetermined sequence of path/filenames and communication protocols searching for a path/protocol combination that produces a successful boot sequence. When the user station boots successfully, the boot code records the successful path/protocol information in the user station NVRAM. During a subsequent boot, the boot code retrieves the path/protocol information from the NVRAM and uses it to boot thereby eliminating the potentially time consuming process of attempting to boot from one or more path/protocol combinations that were tried previously (and unsuccessfully).

The invention still further contemplates boot code and a boot process in which the boot code initially attempts to boot the user station using a dynamic protocol such as DHCP. If one or more boot parameters are not successfully supplied by the DHCP server, the boot code will check information stored in the user station NVRAM to determine if values for the missing parameter(s) may be supplied by default values in a boot parameter table. Typically, the parameter table is also maintained on the NVRAM. The boot parameter table may include information per entry that indicates whether a value for the corresponding boot parameter may be supplied by the boot parameter table in NVRAM. In addition, the boot code typically allows a user to modify the boot parameter table to indicate which boot parameter values may be supplied by default if the dynamic boot process fails. If a boot server fails to return a value for a parameter that may not be specified by the default table in NVRAM, the boot code may take alternative action such as aborting the boot process or attempting to boot entirely from NVRAM. If the boot server fails to return a value for a parameter that may be supplied by default, the appropriate default value is retrieved from the boot parameter table of the user station and the boot sequence is allowed to complete successfully.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 1:
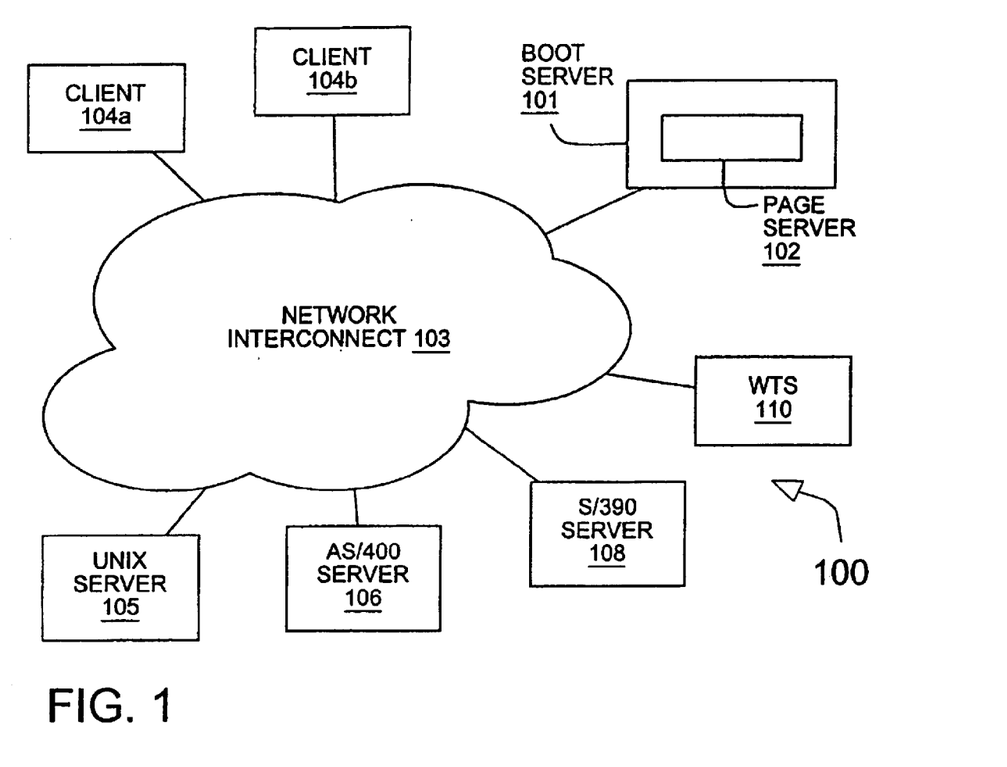
FIG. 1 is a diagram of a data processing network.

Turning now to the drawings, FIG. 1 depicts an exemplary computer network 100 in which the present invention may be employed advantageously. In the depicted embodiment, network 100 includes multiple data processing devices that are interconnected by a network interconnect 103. Network 100 and network interconnect 103 may be implemented with any of a variety of suitable topologies, physical media, and data communications protocols. In one common example, network 100 and interconnect 103 form a local area network (LAN) that uses the TCP/IP communication protocol.

Figure 4:
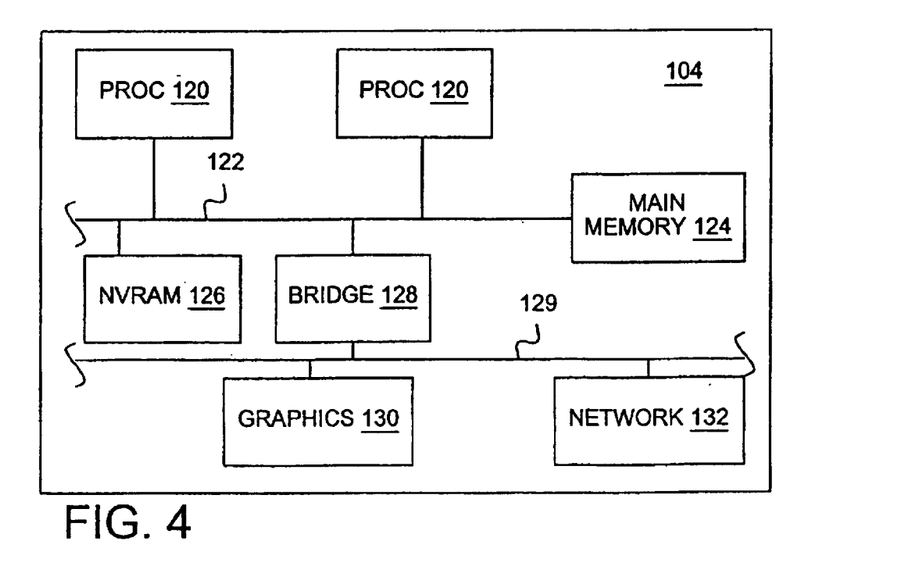
FIG. 4 is a block diagram of a user station suitable for use in the data processing network of FIG. 1.

Network 100 includes a variety of data processing device types including a boot server 101 that may include a corresponding code page server 102. Network 100 is shown as further including multiple user stations, also referred as clients or thin clients 104a and 104b (generically or collectively referred to herein as client(s) 104). Thin clients 104 refer generally to a class of low cost data processing devices that depend upon a remote host to supply their code pages for normal operation. Referring briefly to FIG. 4, client 104 may be designed with one or more processors 120 that are connected to a main memory or system memory 124 over a system bus or memory bus 122. Processors 120 may be implemented with any of a variety of microprocessors such as the PowerPC® processor from IBM Corporation.

Typically, client 104 includes a non-volatile storage device such as a ROM, EEPROM, or flash card, that may contain sufficient code to enable to client 104 to download an operating system from a network server such as boot server 101. Client 104 may also include a bus bridge 128 that couples system bus 122 to a peripheral bus 129. A peripheral bus, such as a Peripheral Components Interface (PCI) bus, connects various peripheral devices to system bus 129. The peripheral devices may include a graphics adapter 130 and a network adapter 132 through which client 104 is connected to network 100.

Clients 104 may be implemented with any of a variety of network station systems such as the NetVista™ line of thin client devices from IBM Corporation. The depicted embodiment of Network 100 further includes application server systems including, as examples, a Unix server such as an RS/60000® server 105, a business server such as an AS/400® server 106, and an enterprise server such as an S/390® server 108, all available from IBM Corporation. Network 100 may further include a Windows Terminal Server (WTS) 110 from Microsoft in combination with a software interface, such as Metaframe™ from Citrix Systems, Inc., that allows a client, such as Citrix ICA®, running on the thin client to access WTS 110. Although network 100 is illustrated as including a specific combination of network devices, those knowledgeable in the field of data processing networks will appreciate that network 100 may incorporate various combinations of the devices indicated in FIG. 1 and may include a variety of additional network devices not illustrated without departing from the spirit and scope of the disclosed network.

In one embodiment, network 100 supports a Dynamic Host Communication Protocol. DHCP is a network protocol that enables a properly configured server (a DHCP server) to automatically assign an internet protocol (IP) address to the TCP/IP stack software of a client computer 104. A DHCP server assigns client 104 IP address dynamically from a pre-defined range of IP addresses for the network. Clients 104 configured to use DHCP for IP assignment do not need to have a statically assigned IP address and generally do not need to have addresses configured for a Domain Name Server (DNS), which can also be dynamically assigned by the DHCP server.

If client 104 includes a DHCP client, client 104 typically broadcasts a request when client 104 is booted such as by turning power on or by otherwise resetting client 104. The broadcasted request attempts to find a DHCP server that can answer the request. A router (not depicted) in network 100 may receive the request and direct client 104 to an appropriate DHCP server, which may be the boot server 101 depicted in FIG. 1. After the client 104 and DHCP server establish communication by exchanging appropriate handshaking signals, the server may assign an IP number from a range defined on the server. The DHCP server may also provide to client 104 other information such as the IP address of a gateway device, the IP address of a DNS server, the IP address of the boot server, as well as the path/filename used to configure client 104. One or more pieces of this information may be required to complete the boot sequence successfully.

If the DHCP server in a conventional network 100 fails to supply all of the required data, the boot process may fail or client 104 may attempt to boot using data stored in a non-volatile storage device of client 104. The present invention contemplates improving the likelihood of successfully booting client 104 and providing additional control of the boot sequence by allowing the user to specify what boot parameters, if any, may be supplied by client 104 itself if the DHCP server fails to provide values for all required boot parameters.

Figure 2:
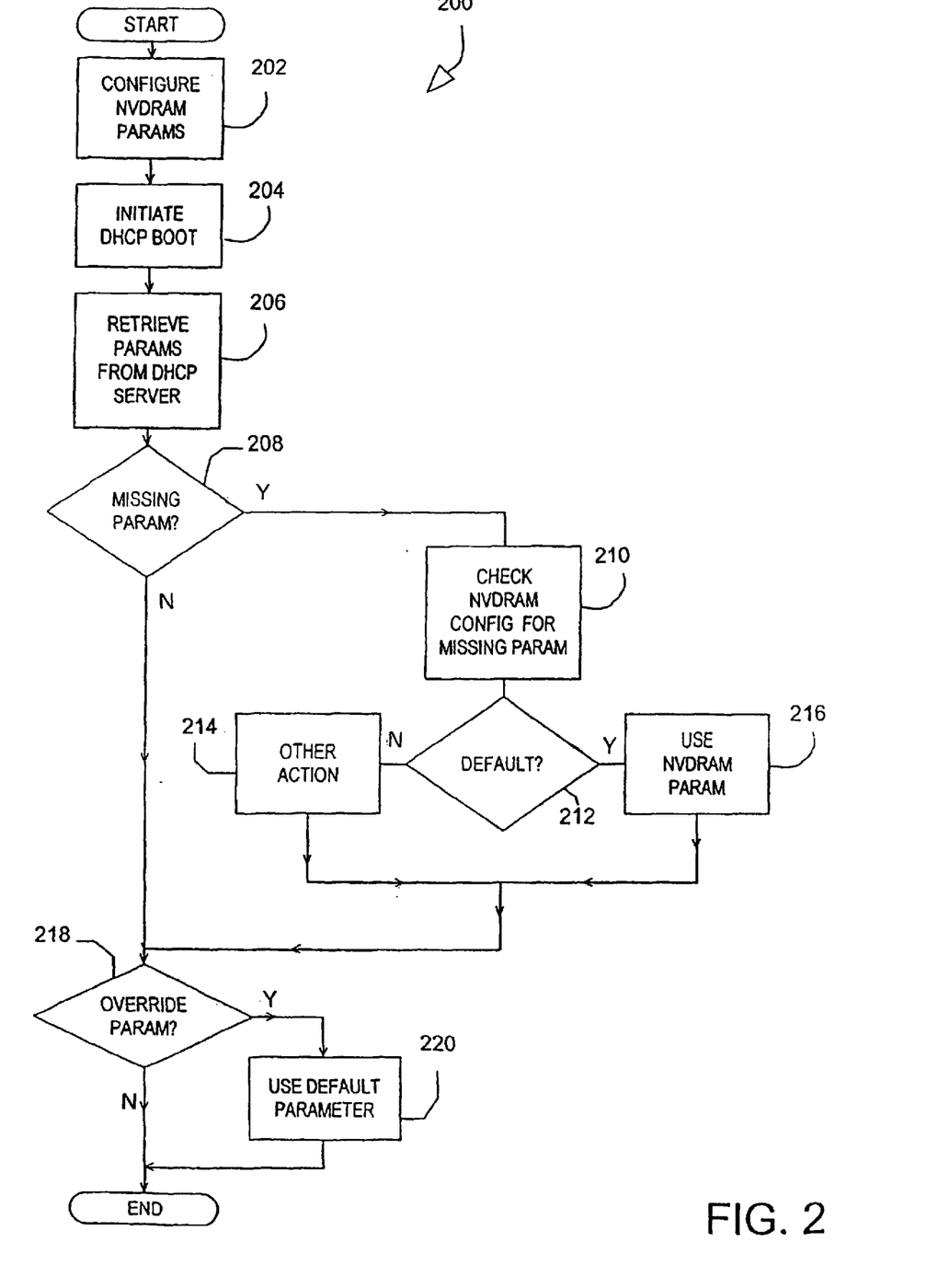
FIG. 2 is a flow diagram of a method of booting a user station on a data processing network according to one embodiment of the invention.
Figure 3:
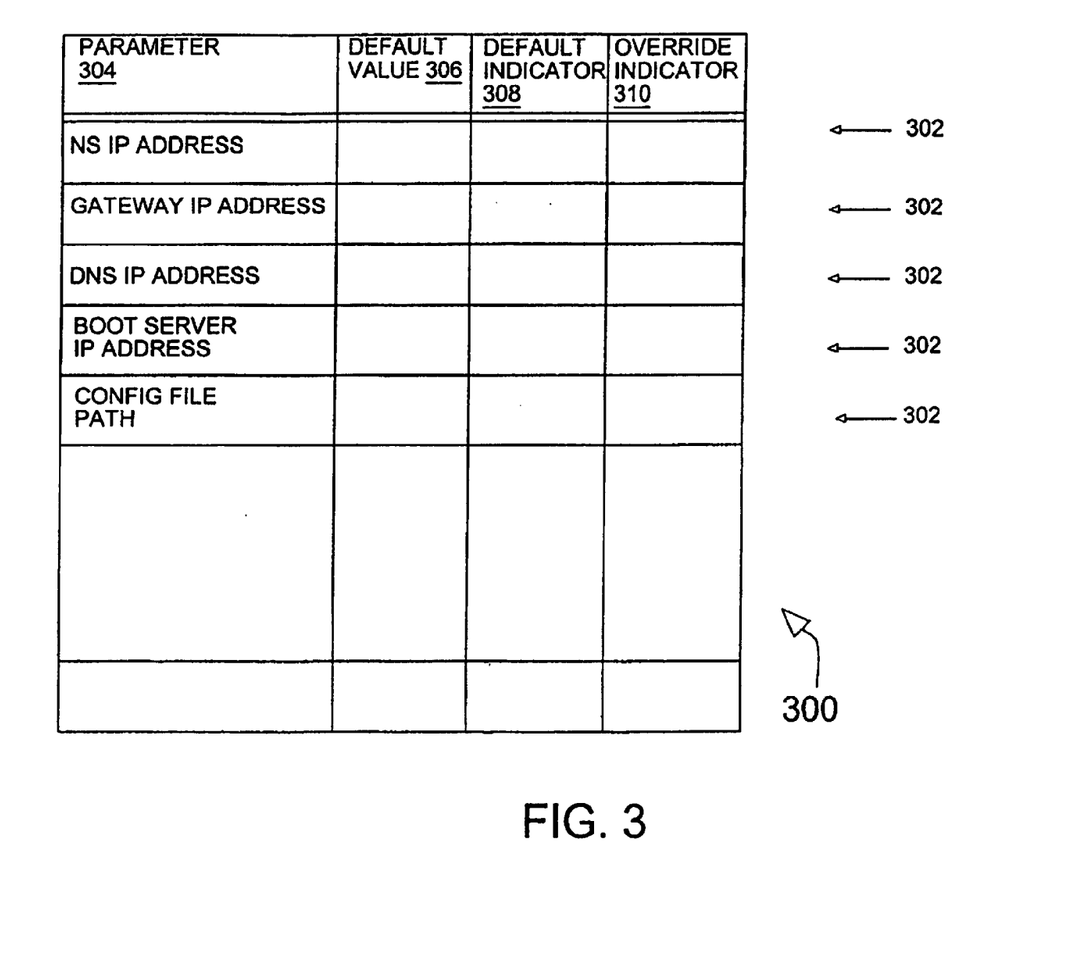
FIG. 3 is a conceptual representation of a boot parameter table in a user station according to one embodiment of the invention.

Referring to the flow diagram of FIG. 2 and the conceptual representation of NVRAM 126 depicted in FIG. 3, a method 200 is disclosed for booting a user station or client in a data processing network according to one embodiment of the invention. Initially, in block 202, a set of boot parameter values is configured in permanent (non-volatile) memory of client 104. NVRAM 126 is typically programmable by applying a pre-defined set of voltage and timing conditions to its input pins. FIG. 3 illustrates the boot parameter values that may be stored locally in NVRAM 126 of client 104. These parameters may include the IP address of client 104, the IP address of a network gateway device, the IP address of a network DNS, the IP address of the boot server, the path/filename of a configuration file for client 104, as well as other appropriate values.

In one embodiment, NVRAM 126 contains a boot parameter table 300, a conceptualized illustration of which is illustrated in FIG. 3. Table 300 includes a set of entries 302, each of which is associated with a particular boot parameter 304. For each entry 302, table 300 indicates a default value 306 and a default indicator 308. The default indicator 308 indicates whether the corresponding default value may be for the corresponding boot parameter in the event that a DHCP boot server fails to supply a corresponding value for the parameter. Thus, the default indicator may be implemented as a programmable Boolean variable. If a particular default indicator is true and a DHCP boot is initiated that fails to retrieve a value for the corresponding boot parameter, the boot software supplies the default value from table 300 if the DHCP server does not return a value for that parameter. If the default indicator is false, the boot sequence may either abort or take other action, but the corresponding default value in table 300 is not used.

The default value table 300 may further include an override indicator 310 for each entry 302. The override indicator 310 may indicate whether the corresponding boot parameter should set to the default value 306 in table 300 regardless of whether a valid value is retrieved from the boot server. If the override indicator is asserted, the value (or non-value) retrieved from the boot server is unconditionally ignored and the default value is used by the boot sequence instead. In this embodiment, the method 200 of booting a user station as described previously with respect to FIG. 2 further includes a block 218 in which the boot sequence determines whether an override pertains to a particular boot parameter and, if so, replacing the parameter value retrieved from the boot server with the default parameter.

In one embodiment, the configuration of NVRAM 126 is facilitated by a software user interface that is invoked by the user during the boot sequence. In this embodiment, the user may program the appropriate values of table 300 by first booting client 104. Typically, the user can enter a program mode by entering a predetermined keyboard sequence during the early stages of the boot sequence. After entering the boot sequence, the information in table may be displayed to the user in a format similar to the format depicted in FIG. 3. The user may then alter the table values of one or more entries 302 of table 300 using standard keyboard and mouse commands. After configure table 300, the user can then exit the program mode and resume the boot sequence.

Referring back to FIG. 2, after configuring NVRAM 126 in block 202, a boot event occurs in block 204. The boot event may be caused by a power off/on sequence, a reset button on client 104, or a network wake-up event. In the preferred embodiment, client 104 preferentially initiates a DHCP boot (block 204). As part of the DHCP boot, boot parameters are retrieved (block 206) from a suitable DHCP server. After all available boot parameters have been retrieved from the DHCP server, the boot sequence determines (block 208) whether the DHCP server failed to supply any required boot parameter values.

If one or more required boot parameter values are missing at the completion of the DHCP boot sequence, the boot sequence then checks (block 210) the boot parameter table 300 of client 104 to determine if a default value can be supplied for the missing boot parameter(s). To make this determination, the boot sequence software may check (block 212) the default indicator 308 of the appropriate entry 302 in table 300. If default indicator 308 is true, the value assigned to the boot parameter is retrieved (block 216) from the corresponding default value 306 in table 300. If default indicator 308 is false, the boot sequence may take other action (block 214) such as terminating the boot sequence, re-starting the boot sequence, or prompting the user for additional information. In one implementation, if the DHCP boot fails to supply a necessary value and table 300 indicates that the NVRAM default may not be substituted, an NVRAM boot sequence may be reinitiated. In the NVRAM boot sequence, all boot parameter values are supplied by the boot parameter table 300. Thus, the user can specify that, if the DHCP server fails to supply any of the boot parameter values, all boot parameter values are supplied by NVRAM.

In one embodiment, the information in boot parameter table 300 is displayed when the user enters an NVRAM programming mode. The NVRAM programming mode may be invoked by entering a predetermined keyboard sequence during the boot sequence. The information in table 300 may be represented graphically. In one embodiment, for example, boot parameters that may be used as default values in the event that the corresponding DHCP boot parameter is missing are indicated with one color while boot parameters that may be used as default values are indicated in a second color.

By allowing the user to control the parameters for which NVRAM default values may be supplied when a DHCP server fails to supply a value, the invention enables greater control and improves the reliability of the boot sequence.

Figure 5:
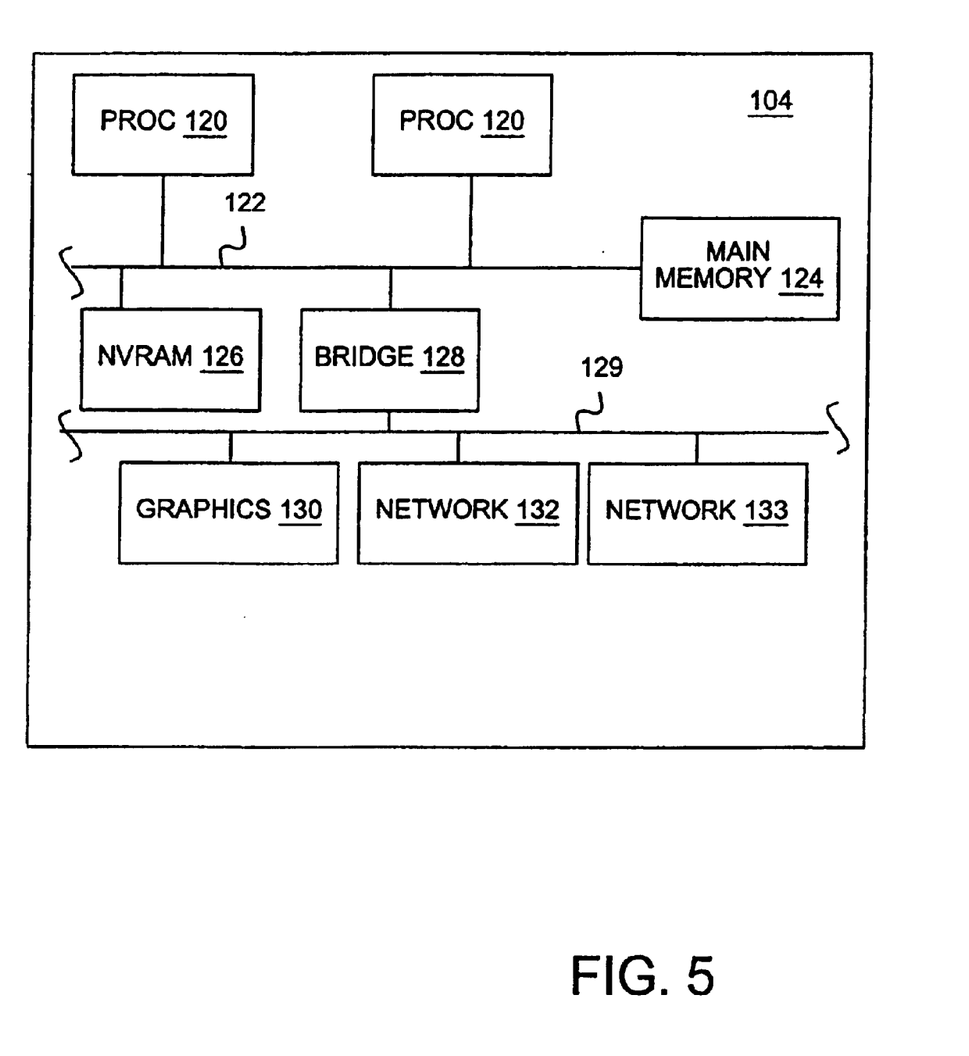
FIG. 5 is a block diagram of a user station including multiple network adapter ports.

Turning now to FIG. 5, a block diagram of a user station 104 according to one embodiment of the invention is depicted. In the depicted embodiment, user station 104 includes the same components as user station illustrated in FIG. 1. The user station 104 of FIG. 5, however, includes a second network adapter 133 in addition to the first network adapter 132. A second network adapter may be included in systems that might be connected to one of two networks in a particular implementation. The connector for the first network adapter 132 may be included in the motherboard of user station 104 while the second network adapter may be provided by an expansion. In other embodiments, both network adapter connections may be provided by expansion cards. In either event, the provision of a second network adapter beneficially improves the versatility of user station 104 by enabling it to be connected to two different network types. As an example, the first network adapter may enable user station 104 to connect to an Ethernet network while the second network adapter may enable user station 104 to connect to a token ring network.

Figure 6:
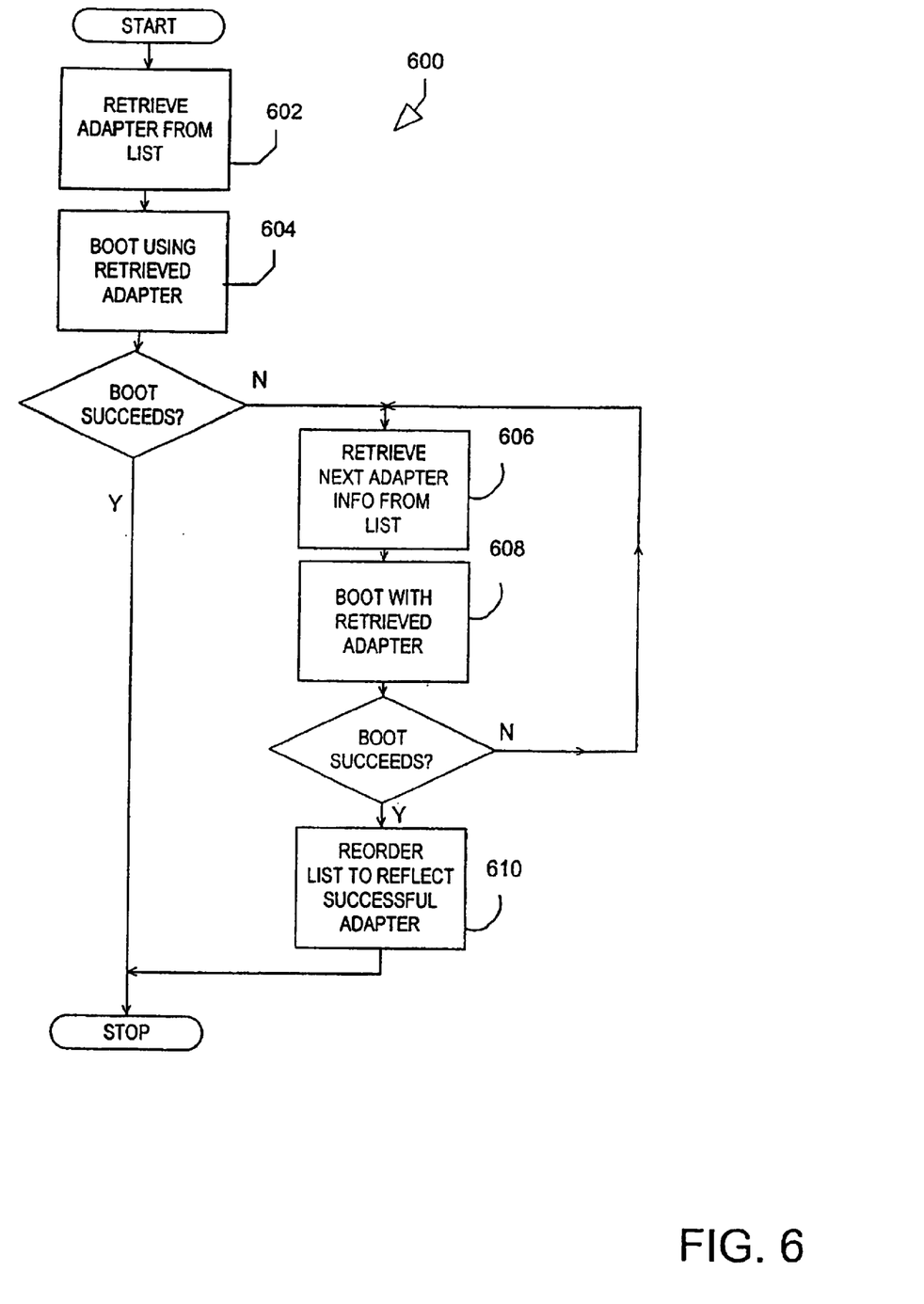
FIG. 6 is a flow diagram of a method of booting a user station in a data processing network according to one embodiment of the invention.

Regardless of the types of adapters, conventional boot code software supports only a single network adapter that is "hard coded." The present invention contemplates the flexibility of providing a user station 104 with more than one adapter and designing the boot code to determine automatically which of the adapters is functional (i.e., is connected to a network and permits access to a boot server). Referring to FIG. 6, a flow diagram of a method 600 of booting a user station with multiple adapters is illustrated. In the depicted embodiment, the boot code may retrieve (block 602) adapter information from a list of adapters. The adapter list (not depicted) may be stored in NVRAM 126 of user station 104. The adapter list may identify in sequential order each of the available network adapters of user station 104. The first time user station 104 is booted, the adapter list is ordered according to a pre-determined ordering. Like the boot parameter table 300 discussed above, the adapter list may be edited by the user to order the list in a desired order. The boot code initially retrieves information associated with the first adapter listed in the adapter list.

After identifying a network adapter by retrieving adapter information from the list, the boot code determines whether the identified adapter is connectable to a network. In one embodiment, the boot code makes this determination by attempting to boot (block 604) the user station from a remote server using the identified adapter. If the boot is successful, the correct network adapter is listed first in the list of adapters and no modification of the network adapter list is required.

If, however, the boot fails or the boot code otherwise determines that the current network adapter is not connectable to the network, the next adapter in the list is retrieved (block 606) from the list and the boot code attempts to determine whether the network is attached to the new adapter by booting (block 608) the user station through the selected adapter or by some other suitable means. If the boot is unsuccessful using the newly identified network adapter, the boot code returns to block 606 and retrieves the next adapter from the list and attempts to boot the system with the next retrieved adapter. This sequence continues until the boot code identifies the network adapter that is connectable to the network and the boot attempt using this adapter is successfully completed. After successfully identifying the adapter to which the network is connected, the boot code updates the list of adapters to prioritize the network adapter that is connected to the network to the top of the list so that the correct network adapter will be selected first during a subsequent boot. If the hardware configuration of user station 104 is subsequently altered such as by connecting user station 104 to a different network through another adapter, the change in configuration will be detected during the next boot event and the adapter list will be updated to prioritize the new network adapter. In this manner, the boot code verifies and maintains the adapter list so that the currently connected adapter is prioritized in the adapter list.

Figure 7:
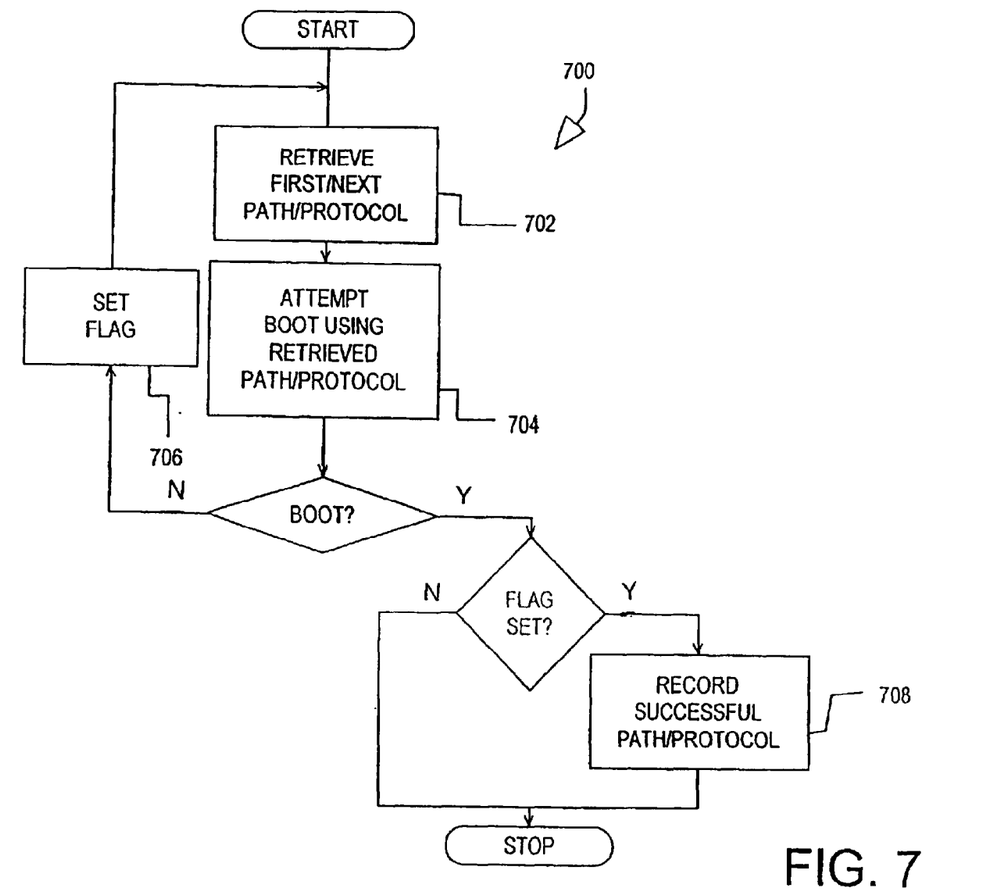
FIG. 7 is a flow diagram of a method of booting a user station in a data processing network according to one embodiment of the invention.

Referring now to FIG. 7, a flow diagram of a method 700 of booting a user station in a data processing network is depicted emphasizing the ability to determine certain operating system information such as a directory path and filename and a communication protocol required to successfully boot a user station from a remote server. After a successful set of operating system information (i.e., the set of operating system information that results in a successful boot) has been identified, the boot code remembers the successful set of operating system information and uses it during a subsequent boot sequence. By automatically determining operating system information during an initial execution of the boot code and, thereafter, using the determined information during subsequent boot events, the present invention beneficially improves the efficiency of the boot process.

As depicted in FIG. 7, a method 700 of booting a user station in a network computer is depicted. The boot code will attempt to boot the user station 104 by sequencing through predetermined sets of operating system information. In one embodiment, each set of operating system information includes a directory path and filename of the operating system kernel to be downloaded from a remote server as well as a communication protocol with which the operating system is to be downloaded. The sets of operating system information may be suitably stored in NVRAM 126 of user station 104. In this embodiment, the sets of operating system information may include a list of standard directory paths and filenames in which operating system kernel code is typically stored. For a given network server/operating system combination, the operating system kernel that is downloaded to a user station 104 as part of the user station's boot sequence, is typically stored in specifically designated directory on the boot server. The user station boot sequence according to the present invention will run through the sets of operating system information, attempting to boot from each of the path/protocols in the list.

In the embodiment illustrated in the flow diagram of FIG. 7, the operating system information includes at least a directory path and filename and a communication protocol. In this embodiment, NVRAM 126 may include a list 800 (FIG. 8) that includes multiple sets 802*a*, 802*b*, etc. (generically or collectively referred to as set(s) 802) of operating system information. Each set 802 may include a directory path/filename parameter 804 that indicates the identity or location of a file or files that includes the operating system kernel that is downloaded to user station 104 during a boot sequence. Each set 802 may further include a protocol parameter 806 that indicates the network communication protocol to be used when retrieving the operating system kernel. Suitable protocols for transferring the operating system kernel from a remote server to user station 104 include the Trivial File Transfer Protocol (TFTP) and the Network File System (NFS) protocol, both of which will be familiar to those knowledgeable in the field of computer networking.

Figure 8:
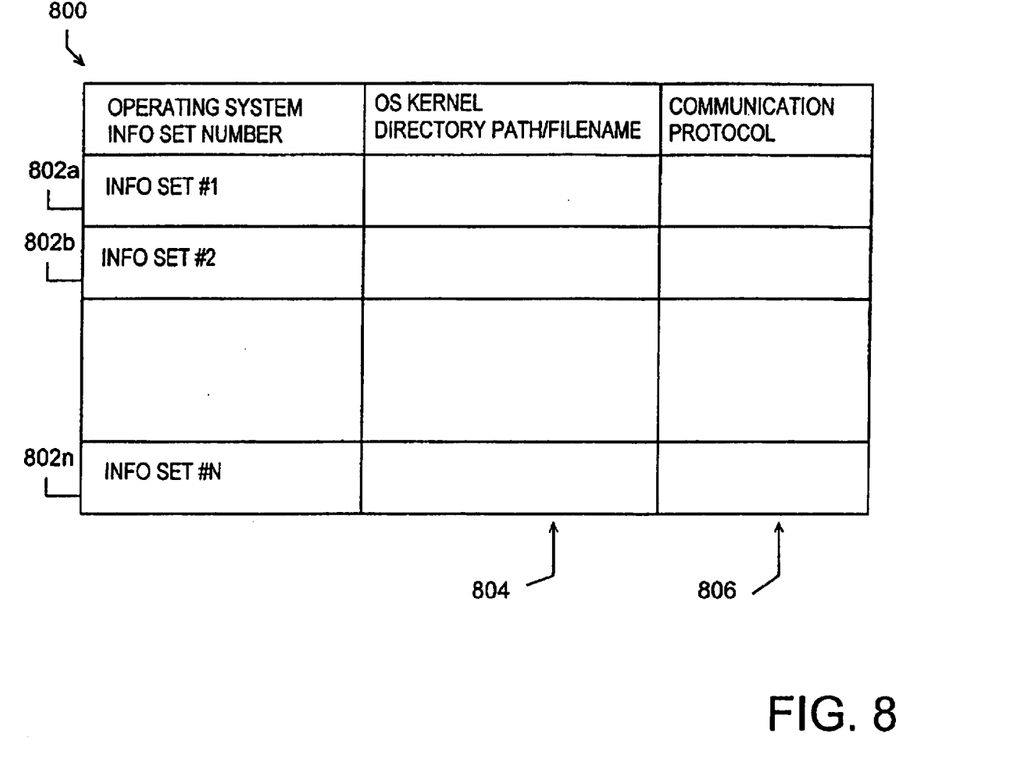
FIG. 8 is a conceptual representation of an operating system information list according to one embodiment of the invention.

When user station 104 is booted, the boot code will retrieve (block 702) the first set 802*a* of path/protocol information from the list 800 stored in NVRAM 126 and attempt to boot (block 704) the user station using the retrieved directory path and communication protocol. If the boot is successful using this set of operating system information, no modification of list 800 is required. If, however, the boot is unsuccessful using the retrieved path/protocol combination, a boot fail flag is set (block 706) and the boot code returns to block 702 where the next set 802*b* of path/protocol information from list 800 is selected. The boot is then attempted again in block 704 using this new path/protocol. This process is repeated until the boot is successful.

Following a successful boot, the boot code checks to see if the boot fail flag is set. If the flag is set, it indicates that the first set 802*a* of path/protocol information should no longer be the first set in list 800. To improve the efficiency of the boot process, it is desirable if the first set 802 in list 800 is the set 802 that boots the user station 104 successfully. Under the assumption that the configuration of the network changes relatively infrequently, the boot code, upon determining that the boot fail flag was set, rewrites (block 708) the path/protocol list 800 to prioritize the successful set of path/protocol information. In other words, the list 800 is rewritten if block 708 to insert the successful set 802 of path/protocol information at the top of the list. In this manner, the correct path/protocol will be the first selected path/protocol during a subsequent boot. If the network configuration is modified, the boot sequence will identify the correct path/protocol during the next boot sequence and place it at the top of the list. Thus, the path/protocol list will be maintained such that the correct path/protocol is typically the first selected path/protocol.

The methods described above with respect to FIGS. 7 and 8 may be implemented in conjunction with one another. As an example, the boot code may initially employ method 700 of determining (and prioritizing) which of multiple network adapters is currently connectable to the network prior to using method 800 to determine (and prioritize) which of several path/protocol combinations is required to boot the user station. Similarly, the method 200 described with respect to FIG. 2 can be used with methods 700 and 800 such that, for example, after determining the correct network adapter using method 700 and the correct path/protocol using method 800, the boot process may determine whether default values may be substituted for one or more parameters not supplied by the remote server and whether default values may override any parameters supplied by the remote host.

The methods of the present invention are capable of being implemented as a program product (i.e., computer software) in a variety of forms, and that the present invention applies equally regardless of the particular type of computer readable media utilized. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

It will be apparent to those skilled in the art having the benefit of this disclosure that the present invention contemplates improving the boot sequence process for user stations that depend upon a remote host. It is understood that the form of the invention shown and described in the detailed description and the drawings are to be taken merely as presently preferred examples. It is intended that the following claims will be interpreted broadly to embrace all the variations of the preferred embodiments disclosed.

What is claimed is:

1. A method of booting a user station in a computer network, comprising:

responsive to a boot event, retrieving a first entry in an operating system information table, wherein each entry in th table identifies a directory path and a filename;

attempting to boot the user station from a remote server in the computer network including attempting to download an operating system kernel from a location on the remote server indicated by the directory path and filename;

if the boot attempt fails, iteratively retrieving a next entry from the operating system information table and attempting to boot the user station from the remote server using the next entry;

upon successfully booting the user station, modifying the operating system information table to prioritize the entry that resulted in a successful boot if the initial boot attempt failed, wherein the successful entry is selected first following a subsequent boot event.

2. The method of claim 1, wherein each entry of the operating system information table further includes a network protocol with which the user station attempts to download the kernel.

3. The method of claim 1, wherein attempting to boot the user station using the first entry in the operating system information table includes retrieving the first entry from a non-volatile storage device of the user station.

4. The method of claim 1, wherein selecting the next operating system information table entry includes retrieving the next entry from an operating system information table stored in a non-volatile storage device of the user station.

5. The method of claim 1, further comprising, prior to attempting to boot the user station, selecting one of multiple network adapters of the user station and determining if the selected network adapter is connected to a network.

6. The method of claim 5, further comprising, selecting another of the network adapters if the previously selected network adapter is not connected to the network and, upon successfully selecting a network adapter that is connected to the network, prioritizing the network adapter that is connected to the network for a subsequent boot attempt.

7. The method of claim 6, wherein the user station includes a list of network adapters in a non-volatile storage device of the user station and wherein prioritizing the network adapter comprises prioritizing the list of network adapters wherein the adapter connected to the network is first selected during a subsequent boot attempt.

8. A computer program product residing on a computer readable medium for booting a user station in a computer network, the computer program product comprising:

computer code means retrieving a first entry in an operating system information table responsive to a boot event, wherein each entry in the table identifies a directory path and a filename;

computer code means for attempting to boot the user station from a remote server in the computer network including attempting to download an operating system kernel from a location on the remote server indicated by the directory path and filename;

computer code means for iteratively retrieving a next entry from the operating system information table if the boot attempt fails and for attempting to boot the user station from the remote server using the next entry;

computer code means for modifying the operating system information table upon successfully booting the user station to prioritize the entry that resulted in a successful boot if the initial boot attempt failed, wherein the successful entry is selected first following a subsequent boot event.

9. The computer program product of claim 1, wherein each end of the operating system information table further includes a network protocol with which the user station attempts to download the kernel.

10. The computer program product of claim 8, wherein the code means for attempting to boot the user station using the first entry in the operating system information table includes code means for retrieving the first entry from a non-volatile storage device of the user station.

11. The computer program product of claim 8, wherein the code means for selecting the next operating system information table entry includes code means for retrieving the next entry from an operating system information table stored in a non-volatile storage device of the user station.

12. The computer program product of claim 8, further comprising, computer code means for selecting one of multiple network adapters of the user station prior to attempting to boot the user station and determining if the selected network adapter is connected to a network.

13. The computer program product of claim 12, further comprising, computer code means for selecting another of the multiple network adapters if the previously selected network adapter is not connected to the network and, upon successfully selecting a network adapter that is connected to the network, prioritizing the network adapter that is connected to the network for subsequent boot attempts.

14. The computer program product of claim 13, wherein the user station includes a list of network adapters in a non-volatile storage device of the user station and wherein prioritizing the network adapter comprises prioritizing the list of network adapters wherein the adapter connected to the network is first selected during a subsequent boot attempt.

15. A user station in a computer network comprising:

at least one processor connected to a system memory via a system bus;

a bus bridge connected between the bus bridge and a peripheral bus;

at least one network adapter connected to the peripheral bus;

a non-volatile storage device configured with boot sequence code executable by the processor, wherein the boot sequence code includes:

computer code means retrieving a first entry in an operating system information table responsive to a boot event, wherein each entry in the table identifies a directory path and a filename;

computer code means for attempting to boot the user station from a remote server in the computer network includig attempting to download an operating system kernel from a location on the remote server indicated by the directory path and filename;

computer code means for iteratively retrieving a next entry from the operating system information table if the boot attempt fails and for attempting to boot the user station from the remote saver using the next entry;

computer code means for modifying the operating system information table upon successfully booting the user station to prioritize the entry that resulted in a successful boot if the initial boot attempt failed, wherein the successful entry is selected first following a subsequent boot event.

16. The user station of claim 15, wherein each of the operating system information table further includes a network protocol with which the user station attempts to download the kernel.

* * * * *